(12) United States Patent
Mashatan et al.

(10) Patent No.: US 9,083,535 B2
(45) Date of Patent: Jul. 14, 2015

(54) METHOD AND APPARATUS FOR PROVIDING EFFICIENT MANAGEMENT OF CERTIFICATE REVOCATION

(75) Inventors: Atefeh Mashatan, Ecublens (CH); Imad Aad, Bottens (CH); Rafik Chaabouni, Vésenaz (CH); Pentti Valtteri Niemi, Turku (FI); Serge Vaudenay, Crissier (CH)

(73) Assignee: Nokia Corporation, Espoo (FI)

( * ) Notice: Subject to any disclaimer, the term of this patent is extended or adjusted under 35 U.S.C. 154(b) by 90 days.

(21) Appl. No.: 13/882,812

(22) PCT Filed: Nov. 5, 2010

(86) PCT No.: PCT/IB2010/055047
§ 371 (c)(1),
(2), (4) Date: May 1, 2013

(87) PCT Pub. No.: WO2012/059794
PCT Pub. Date: May 10, 2012

(65) Prior Publication Data
US 2013/0238897 A1   Sep. 12, 2013

(51) Int. Cl.
  *H04L 9/32*  (2006.01)
  *H04L 29/06*  (2006.01)
(52) U.S. Cl.
  CPC .......... *H04L 9/3268* (2013.01); *H04L 63/0823* (2013.01); *H04L 63/20* (2013.01)
(58) Field of Classification Search
  CPC .................................................. H04L 9/3268
  See application file for complete search history.

(56) References Cited

U.S. PATENT DOCUMENTS 5,793,868 A * 8/1998 Micali ............................. 380/28
6,370,249 B1 * 4/2002 Van Oorschot ............... 380/277
(Continued)

FOREIGN PATENT DOCUMENTS

| EP | 1594251 | 11/2005 | | |
|---|---|---|---|---|
| WO | 02063847 | 8/2002 | | |
| WO | WO 2010086802 A1 * | 8/2010 | ................ | H04L 9/32 |

OTHER PUBLICATIONS

Qing, Sihan, Hideki Imai, and Guilin Wang. "A New Dynamic Accumulator for Batch Updates." Information and Communications Security 9th International Conference, ICICS 2007, Zhengzhou, China, Dec. 12-15, 2007: Proceedings. Berlin: Springer, 2007. 98-112.*

(Continued)

*Primary Examiner* — Gilberto Barron, Jr.
*Assistant Examiner* — Alexander Lapian
(74) *Attorney, Agent, or Firm* — Mintz Levin Cohn Ferris Glovsky and Popeo, P.C.

(57) ABSTRACT

A method for providing efficient management of certificate revocation may comprise storing a list of identifiers of digital certificates including a revocation list defining a list of revoked certificates in an accumulator, storing a witness value in association with at least some entries in the revocation list in which the witness value provides proof of the membership or non-membership of an identifier in the revocation list, enabling generation of a new accumulator and a new witness value responsive to each insertion or deletion of an entry in the revocation list, and enabling batch updates to the revocation list using a reduced bitlength value generated based on to a ratio of a value generated based on elements added to the revocation list to a value generated based on elements deleted from the revocation list. A corresponding apparatus is also provided. A method for certificate authorities (CA) that use Bloom filters for certificate revocation list (CRL) compression that enables the CA to hash only the entry that is to be un-revoked so that a good compression rate may be provided while avoiding computation of the entire CRL for each un-revocation.

12 Claims, 7 Drawing Sheets

(56) References Cited

U.S. PATENT DOCUMENTS

| | | | |
|---|---|---|---|
| 6,397,329 B1* | 5/2002 | Aiello et al. | 713/155 |
| 2003/0014629 A1* | 1/2003 | Zuccherato | 713/156 |
| 2003/0177352 A1* | 9/2003 | Camenisch et al. | 713/158 |
| 2003/0182549 A1* | 9/2003 | Hallin et al. | 713/156 |
| 2004/0107346 A1* | 6/2004 | Goodrich et al. | 713/176 |
| 2005/0053045 A1* | 3/2005 | Chmora et al. | 370/338 |
| 2005/0071631 A1* | 3/2005 | Langer | 713/156 |
| 2006/0137006 A1* | 6/2006 | Ramzan et al. | 726/21 |
| 2008/0034203 A1* | 2/2008 | Camnisch et al. | 713/156 |

OTHER PUBLICATIONS

International Search Report received for corresponding Patent Cooperation Treaty Application No. PCT/IB2010/055047, dated May 24, 2011, 3 pages.

* cited by examiner

METHOD AND APPARATUS FOR PROVIDING EFFICIENT MANAGEMENT OF CERTIFICATE REVOCATION

RELATED APPLICATION

This application was originally filed as PCT Application No. PCT/IB2010/055047 filed Nov. 5, 2010

TECHNOLOGICAL FIELD

An embodiment of the present invention relates generally to public key cryptography and, more particularly, relates to a method and apparatus for providing efficient management of certificate revocation.

BACKGROUND

The modern communications era has brought about a tremendous expansion of wireline and wireless networks. Computer networks, television networks, and telephony networks are experiencing an unprecedented technological expansion, fueled by consumer demand. Networking technologies have addressed related consumer demands, while providing more flexibility and immediacy of information transfer.

Current and future networking technologies continue to facilitate ease of information transfer and convenience to users by expanding the capabilities of electronic devices and by improving network performance. One advance that has improved the capabilities of electronic devices to provide services to users is the use of public key cryptography. Public key cryptography uses people, equipment and policies to manage the generation, use and revocation of digital certificates. A certificate authority (CA) is typically responsible for issuing the digital certificates.

Public key cryptography assumes the existence of a pair of keys for each user, a private key and a public key. The keys are bound to each other in a way that protects the system from malicious users. The validity of these keys and the fact that a key belongs to an identity is assured by the CA through publishing of the digital certificate. Once the identities and their keys are in place, users can employ their respective certificates to identify themselves to each other. Certificates typically have a natural expiration date, but they can be revoked before they expire naturally as well.

Networks use information indicative of the identity of devices for both enabling authorized devices to use the network and for preventing other devices from having access privileges based on the status of the certificates. When a device has access to a guaranteed broadband channel, the device can contact the appropriate authority to confirm identification of a certain user. However, a problem may arise when a device does not have any reliable access to a server, or the access is of low bandwidth, both of which may make the process of identification much more complex.

Situations where guaranteed access to a base station is not available can arise under any of a number of circumstances. For example, being in remote areas or being in tunnels or other underground or heavily shielded environments are not uncommon situations for some people to encounter. As such, a user may have a device that does not have guaranteed access to a user that is trusted, while other devices that are more powerful or otherwise situated advantageously may still be able to access a local server. Accordingly, it is typically important for users to be able to identify other devices that they encounter since some could be malicious and intrusive.

BRIEF SUMMARY

A method, apparatus and computer program product are therefore provided to enable efficient management of certificate revocation. In this regard, for example, some embodiments may use an accumulator that is useful for batch updates, allows employment of semi-trusted delegates and may employ zero-knowledge techniques to make proof of non-revocation non-transferable. Some example embodiments may also or alternatively provide for the use of a counter Bloom filter to provide efficient compression without requiring recomputing of the entire Bloom filter for each modification made thereto.

In one example embodiment, a method of providing efficient management of certificate revocation is provided. The method may comprise storing a list of identifiers of digital certificates including a revocation list defining a list of revoked certificates in an accumulator, storing a witness value in association with at least some entries in the revocation list in which the witness value provides proof of the membership or non-membership of an identifier in the revocation list, enabling generation of a new accumulator and a new witness value responsive to each insertion or deletion of an entry in the revocation list, and enabling batch updates to the revocation list using a reduced bitlength value generated based on the ratio of a value generated based on elements added to the revocation list to a value generated based on elements deleted from the revocation list.

In another example embodiment, an apparatus for providing efficient management of certificate revocation is provided. The apparatus may comprise at least one processor and at least one memory including computer program code. The at least one memory and the computer program code may be configured to, with the at least one processor, cause the apparatus to perform at least storing a list of identifiers of digital certificates including a revocation list defining a list of revoked certificates in an accumulator, storing a witness value in association with at least some entries in the revocation list in which the witness value provides proof of the membership or non-membership of an identifier in the revocation list, enabling generation of a new accumulator and a new witness value responsive to each insertion or deletion of an entry in the revocation list, and enabling batch updates to the revocation list using a reduced bitlength value generated based on the ratio of a value generated based on elements added to the revocation list to a value generated based on elements deleted from the revocation list.

In one example embodiment, another apparatus for providing efficient management of certificate revocation is provided. The apparatus may comprise means for storing a list of identifiers of digital certificates including a revocation list defining a list of revoked certificates in an accumulator, means for storing a witness value in association with at least some entries in the revocation list in which the witness value provides proof of the membership or non-membership of an identifier in the revocation list, means for enabling generation of a new accumulator and a new witness value responsive to each insertion or deletion of an entry in the revocation list, and means for enabling batch updates to the revocation list using a reduced bitlength value generated based on the ratio of a value generated based on elements added to the revocation list to a value generated based on elements deleted from the revocation list.

In one example embodiment, a method for providing efficient management of certificate revocation is provided. The method may comprise causing compression of a certificate revocation list using a counter filter at a certificate authority in which the counter filter comprises a plurality of counter positions and each of the counter positions corresponds to a hash function of a revoked certificate identifier, causing conversion of values in the counter filter to binary values such that values greater than zero are converted to ones to form a binary filter, and causing transmission of the binary filter to provide the certificate revocation list to another entity.

In another example embodiment, an apparatus for providing efficient management of certificate revocation is provided. The apparatus may comprise at least one processor and at least one memory including computer program code. The at least one memory and the computer program code may be configured to, with the at least one processor, cause the apparatus to perform at least causing compression of a certificate revocation list using a counter filter at a certificate authority in which the counter filter comprises a plurality of counter positions and each of the counter positions corresponds to a hash function of a revoked certificate identifier, causing conversion of values in the counter filter to binary values such that values greater than zero are converted to ones to form a binary filter, and causing transmission of the binary filter to provide the certificate revocation list to another entity.

In one example embodiment, another apparatus for providing efficient management of certificate revocation is provided. The apparatus may comprise means for causing compression of a certificate revocation list using a counter filter at a certificate authority in which the counter filter comprises a plurality of counter positions and each of the counter positions corresponds to a hash function of a revoked certificate identifier, means for causing conversion of values in the counter filter to binary values such that values greater than zero are converted to ones to form a binary filter, and means for causing transmission of the binary filter to provide the certificate revocation list to another entity.

BRIEF DESCRIPTION OF THE DRAWING(S)

Having thus described some embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also comprises an implementation comprising one or more processors and/or portion(s) thereof and accompanying software and/or firmware. As another example, the term 'circuitry' as used herein also comprises, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the management of digital certificate revocations. In an example situation, a certificate authority (CA) may handle certification and revocation processes for various mobile devices. A first mobile device and a second mobile device may be positioned such that both the first and second mobile devices do not have guaranteed access to a network. Accordingly, it may be desirable for provision of a mechanism by which, for example, the first mobile device may authenticate itself to the second mobile device by providing a valid, non-revoked certificate when both the first and second mobile devices are offline.

One way to accomplish the authentication described above may be for the CA to create a compressed certificate revocation list (CRL) that may be sent to users over relatively low bandwidth channels. The users may receive the CRL over the low bandwidth channel and perform offline verification of other users based on the contents of the CRL. Some embodiments of the present invention may provide for the use of an accumulator of certificate identifiers and also provide techniques for proving membership (or non-membership) of entries in the accumulator. Some embodiments may also provide the potential for distribution of the techniques described herein over one or more delegated authorities (or nodes), that can be fully trusted nodes when such delegation is undertaken.

Figure 3:
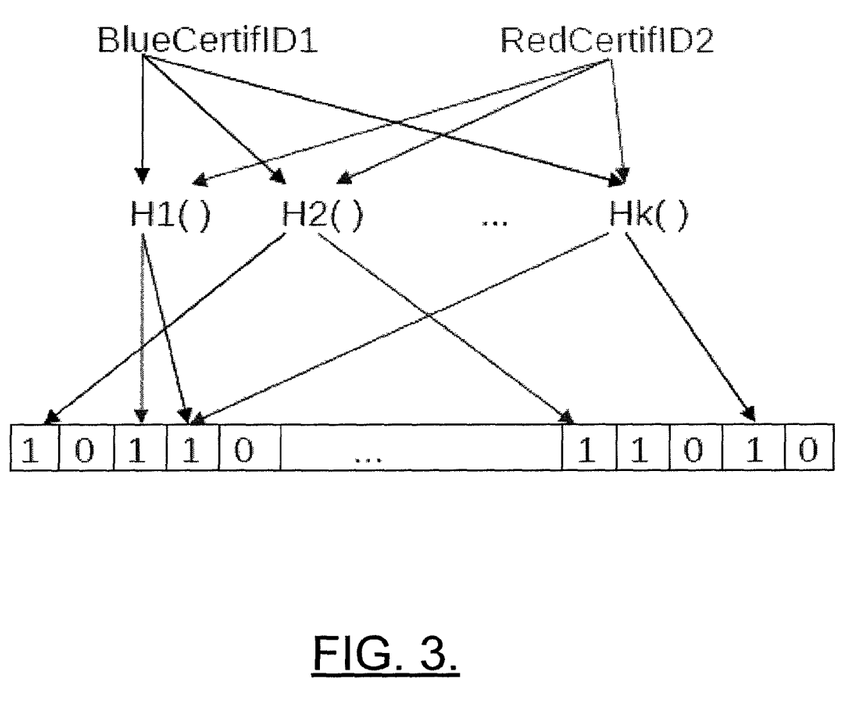
FIG. 3 illustrates a binary Bloom filter according to an example embodiment.

In some embodiments, Bloom filters may be used for CRL compression. An example Bloom filter is shown in FIG. 3.

Bloom filters typically comprise an m-bit vector with all bits initially set to zero. An element can be comprised in the filter by (1) hashing the element with k independent hash functions that output numbers in the range 1, . . . , m, or (2) setting the vector bit to which each hash function points to one. It is possible that one bit may be set to one multiple times due to the addition of several elements. The Bloom filter may then be distributed or published as a compressed list of elements. To check that a given element is contained in the filter, the element may be hashed and the corresponding filter bits may be checked. If at least one of the bits is zero, then the element is not included in the filter. Otherwise, if all necessary k bits are set, typically the element has a high probability of being included. The corresponding bits may have been set also due to multiple additions of other elements (false positive). The more elements added, the higher the probability of encountering false positives.

Bloom filters may be used in connection with databases, in peer-to-peer applications and other communication related environments. Bloom filters may offer high compression rates with relatively low false positives and no false negatives. Accordingly, due to the relatively good compression that can be offered by Bloom filters, the use of Bloom filters for providing CRL compression to adapt CRL provision to low bandwidth channels may be advantageous. However, Bloom filters are sometimes considered to be computationally complex and may require computation of the whole list again after un-revoking a certificate at the CA. Some example embodiments of the present invention have therefore been designed to support un-revoking with relatively light computations on only the certificate that is to be un-revoked. Thus, the compression advantages of Bloom filters may be maintained, while avoiding the necessary resource consumption associated with computation of the whole list again.

Many past solutions have assumed the existence of trusted infrastructures or parties, or have employed techniques that are computationally complex and/or require large amounts of communication bandwidth. As indicated above, some example embodiments may provide for the use of accumulators and/or Bloom filters for use in CRL compression to allow CRL usage in low bandwidth environments.

Figure 1:
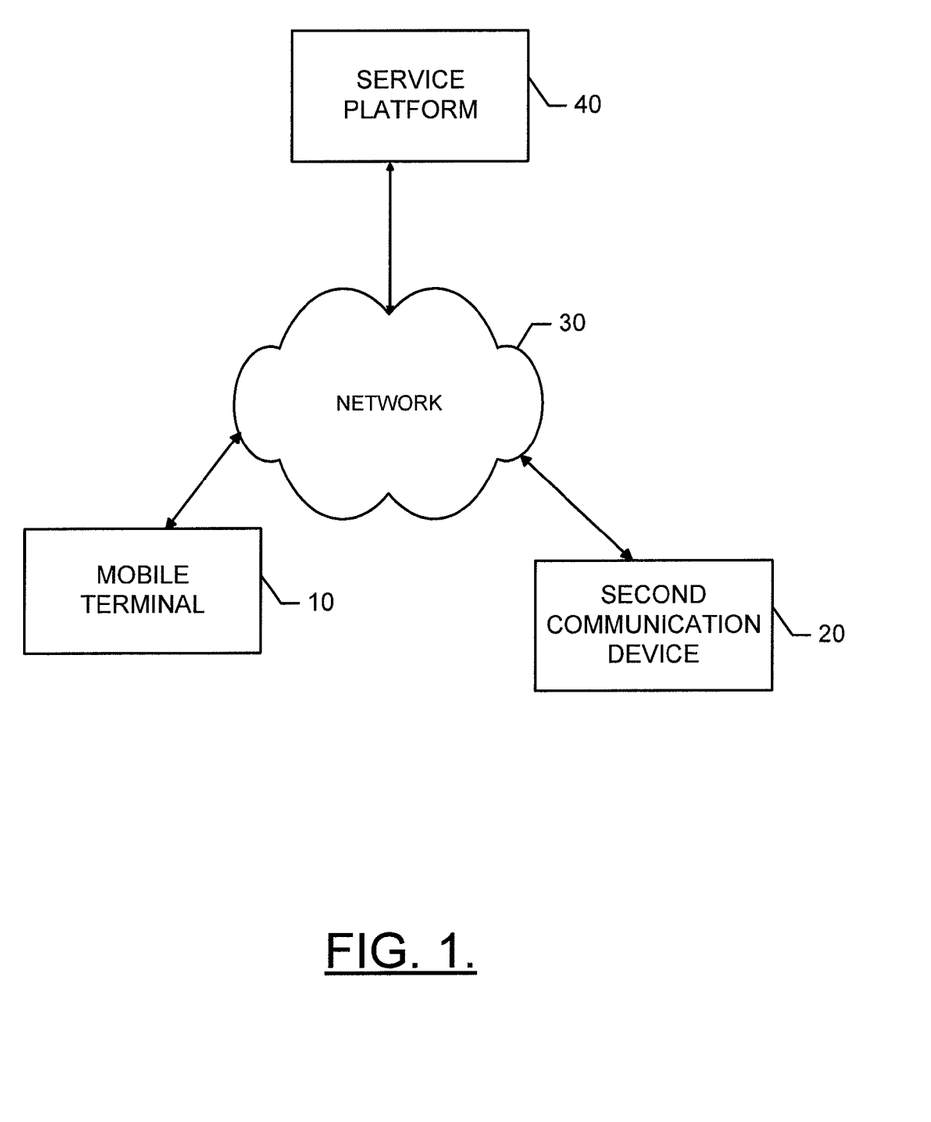
FIG. 1 is a schematic block diagram of a wireless communications system according to an example embodiment of the present invention.

FIG. 1 illustrates a generic system diagram in which a device such as a mobile terminal 10, which may benefit from some embodiments of the present invention, is shown in an example communication environment. As shown in FIG. 1, a system in accordance with an example embodiment of the present invention comprises a first communication device (e.g., mobile terminal 10) and a second communication device 20 that may each be capable of communication with a network 30. The second communication device 20 is provided as an example to illustrate potential multiplicity with respect to instances of other devices that may be included in the network 30 and that may practice an example embodiment. The communications devices of the system may be able to communicate with network devices or with each other via the network 30. In some cases, the network devices with which the communication devices of the system communicate may comprise a service platform 40. In an example embodiment, the mobile terminal 10 (and/or the second communication device 20) is enabled to communicate with the service platform 40 to provide, request and/or receive information. In some examples, the service platform 40 (or another portion of the network 30) may host a certificate authority (CA) as described in greater detail below.

While an example embodiment of the mobile terminal 10 may be illustrated and hereinafter described for purposes of example, numerous types of mobile terminals, such as portable digital assistants (PDAs), pagers, mobile televisions, mobile telephones, gaming devices, laptop computers, cameras, camera phones, video recorders, audio/video player, radio, global positioning system (GPS) devices, navigation devices, or any combination of the aforementioned, and other types of multimedia, voice and text communications systems, may readily employ an example embodiment of the present invention. Furthermore, devices that are not mobile may also readily employ an example embodiment of the present invention. As such, for example, the second communication device 20 may represent an example of a fixed electronic device that may employ an example embodiment. For example, the second communication device 20 may be a personal computer (PC) or other terminal.

In some embodiments, not all systems that employ embodiments of the present invention may comprise all the devices illustrated and/or described herein. For example, while an example embodiment will be described herein in which either a mobile user device (e.g., mobile terminal 10), a fixed user device (e.g., second communication device 20), or a network device (e.g., the service platform 40) may comprise an apparatus capable of performing some example embodiments in connection with communication with the network 30, it should be appreciated that some embodiments may exclude one or multiple ones of the devices or the network 30 altogether and simply be practiced on a single device.

In an example embodiment, the network 30 comprises a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second communication device 20 may be capable of communication with each other via the network 30 and each may comprise an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 20 via the network 30. By directly or indirectly connecting the mobile terminal 10, the second communication device 20 and other devices to the network 30, the mobile terminal 10 and the second communication device 20 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 20, respectively.

Furthermore, although not shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including USB, LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 40 may be a device or node such as a server or other processing device. The service platform 40 may have any number of functions or associations with various services. As such, for example, the service platform 40 may be a platform such as a dedicated server (or server bank) associated with a particular information source or service (e.g., a digital certificate management service), or the service platform 40 may be a backend server associated with one or more other functions or services. As such, the service platform 40 represents a potential host for a plurality of different services or information sources. In some embodiments, the functionality of the service platform 40 is provided by hardware and/or software components configured to operate in accordance with known techniques for the provision of information to users of communication devices. However, at least some of the functionality provided by the service platform 40 may be information provided in accordance with an example embodiment of the present invention.

Figure 2:
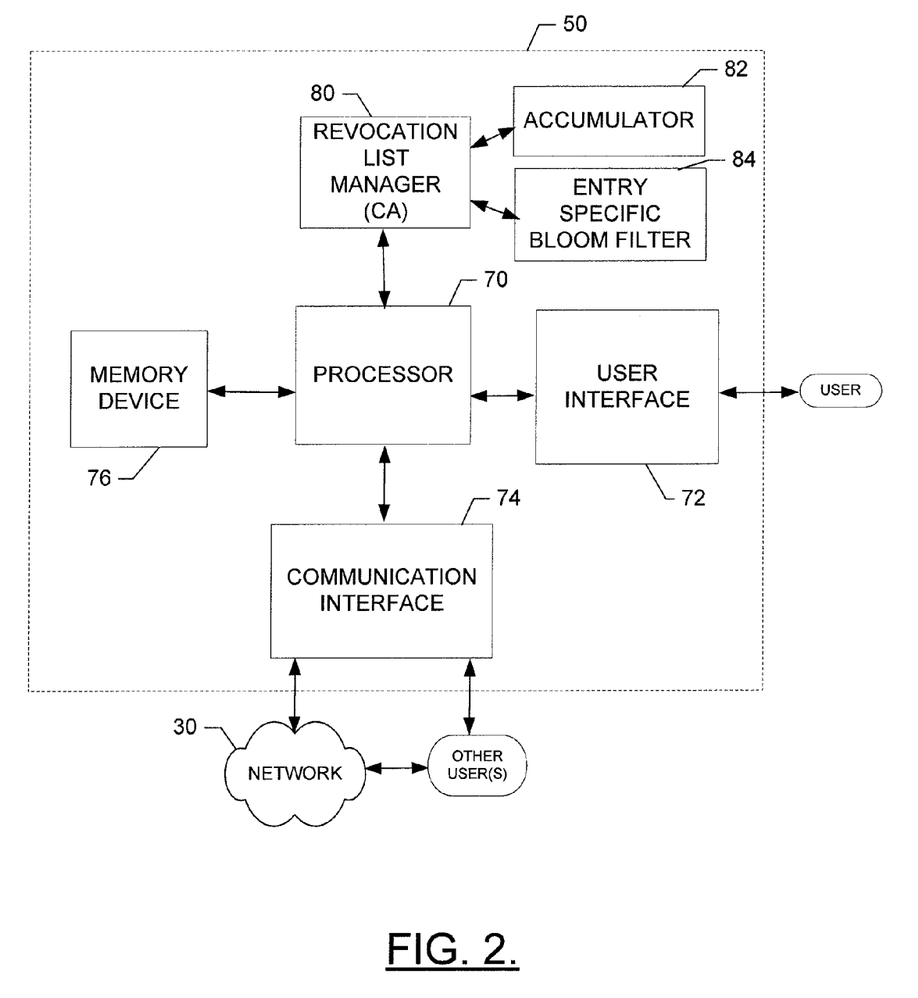
FIG. 2 illustrates a block diagram of an apparatus for providing efficient management of certificate revocation according to an example embodiment of the present invention.

FIG. 2 illustrates a schematic block diagram of an apparatus for providing efficient management of certificate revocation according to an example embodiment of the present invention. An example embodiment of the invention will now be described with reference to FIG. 2, in which certain elements of an apparatus 50 for providing efficient management of certificate revocation are displayed. The apparatus 50 of FIG. 2 may be employed, for example, on the service platform 40 acting as or hosting a certificate authority. However, in some embodiments, the apparatus 50 (or portions thereof) may be employed at the mobile terminal 10 and/or on the second communication device 20 when such devices are acting as a delegate node. However, the apparatus 50 may alternatively be embodied at a variety of other devices, both mobile and fixed (such as, for example, any of the devices listed above). In some cases, an embodiment may be employed on either one or a combination of devices. Accordingly, some embodiments of the present invention may be embodied wholly at a single device (e.g., the service platform 40, the mobile terminal 10 or the second communication device 20), by a plurality of devices in a distributed fashion or by devices in a client/server relationship (e.g., the mobile terminal 10 and the service platform 40). Furthermore, it should be noted that the devices or elements described below may not be mandatory and thus some may be omitted in certain embodiments.

Referring now to FIG. 2, an apparatus for providing efficient management of certificate revocation is provided. The apparatus 50 may comprise or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may comprise, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus 50 to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile or a fixed communication device or computing device configured to employ an example embodiment of the present invention (e.g., the service platform 40). However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in hardware in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), central processing unit (CPU), a hardware accelerator, a vector processor, a graphics processing unit (GPU), a special-purpose computer chip, or other like hardware devices. As such, in some embodiments, the processor 70 may comprise one or more processing cores configured to perform independently. A multi-core processor may enable multiprocessing within a single physical package. Additionally or alternatively, the processor 70 may comprise one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may comprise, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software, that is configured to receive and/or transmit data from/to a network and/or any other device or module in communication with the apparatus. In this regard, the communication interface 74 may comprise, for example, an antenna (or multiple antennas) and supporting hardware and/or software for enabling communications with a wireless communication network. In some environments, the communication interface 74 may alternatively or also support wired communication. As such, for example, the communication interface 74 may comprise a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may comprise, for example, a keyboard, a mouse, a joystick, a display, a touch screen, soft keys, a microphone, a speaker, or other input/output mechanisms. In an exemplary embodiment in which the apparatus 50 is embodied as a server or some other network devices (e.g., the service platform 40), the user interface 72 may be limited, or eliminated. However, in an embodiment in which the apparatus is embodied as a communication device (e.g., the mobile terminal 10 or the second communication device 20) acting as a delegate node, the user interface 72 may comprise, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, comprise or otherwise control a revocation list manager 80. As such, in some embodiments, the processor 70 may be said to cause, direct or control the execution or occurrence of the various functions attributed to the revocation list manager 80 as described herein. The revocation list manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the revocation list manager 80 as described herein. Thus, in examples in which software is employed, a device or circuitry (e.g., the processor 70 in one example) executing the software forms the structure associated with such means.

In an example embodiment, the revocation list manager 80 (referred to interchangeably herein as the certificate authority (CA)) may be configured to compute, calculate and/or generate either or both of an accumulator 82 and an entry specific Bloom filter 84, depending upon which one (or both) of the accumulator 82 or the entry specific Bloom filter 84 is employed in a particular embodiment. Moreover, in some embodiments in which both the accumulator 82 and the entry specific Bloom filter 84 are employed, the revocation list manager 80 may be configured to selectively employ one or both of the accumulator 82 and/or the entry specific Bloom filter 84 as specified by an operator, a user or by specific condition-based rules that may be resident at or accessible to the revocation list manager 80.

In an example embodiment, the accumulator 82 may be used to perform CRL compression. Accordingly, as with the entry specific Bloom filter 84, the accumulator 82 may be employed to assist in handling un-revocation of a revoked certificate in an environment constrained by communication bandwidth. Thus, for example, the accumulator 82 and the entry specific Bloom filter 84 may be useful in connection with networks where, for whatever reason, communication cost is higher (or capabilities are lower) than usual and one may wish to minimize the amount of communication as much as possible.

In some examples, the accumulator 82 may keep a list of identifiers of certificates, including a list of revoked certificates (e.g., a revocation list). The accumulator 82 may also be configured to store a "witness value" in association with some (or each) of the entries in the revocation list. The witness value may be used as proof of the membership or non-membership of an identifier in the revocation list. A problem may occur in some cases if the revocation list is provided to delegate nodes (e.g., the mobile terminal 10 and/or the second communication device 20). In this regard, the delegate nodes would typically be assumed to be fully trusted. As such, if one of the delegate nodes had actually cheated the system by altering the revocation list inappropriately due to the proofs of membership (and non-membership) on the revocation list being transferable, malicious users could harm the system. Accordingly, some example embodiments relax the assumption that all delegate nodes are fully trusted so that possible cheats initiated by delegate nodes can be traced so that specific delegates (e.g., badly behaving delegates) can be revoked. Some embodiments may therefore make proofs of membership and/or non-membership non-transferable.

In an example embodiment, the accumulator 82 may be computed (e.g., via the revocation list manager 80 or CA) as described below. In this regard, from the set X of elements x, the CA can compute an accumulator c as: $c = g^{\Pi x \in X^x} \mod n$ at each new entry, y, the accumulator can be updated as $c' = c^y \mod n$. A witness of membership of x in X may be an integer w such that $c = w^x \mod n$. In some cases, a witness of membership of x in X may be dynamically computed as $w' = w^y \mod n$ after an insertion of y in X. Alternatively or additionally, a new accumulator can be dynamically computed as $c' = c^y \mod n$ as a witness of membership of x in X after an insertion of y in X. In some cases, after a deletion of y from X, the new accumulator can be dynamically computed as: $c' = c^{1/y \mod \phi(n)} \mod n$, where $\phi(n)$ is the Euler's totient function as a witness of membership of x in X. Alternatively or additionally, after a deletion of y from X, the witness can be dynamically computed as: $w' = w^z c^{tk} \mod n$, where $1 = yz + kx$ (x not deleted) as a witness of membership of x in X.

Meanwhile, in some embodiments, a witness of non-membership of x in X may be provided by a pair of integers (a,d) such that $c^a=d^x g \bmod n$. After insertion of y in X, the witness of non-membership of x in X may be dynamically computed as: $a'=az$, $d'=dc^{-ak} \bmod n$, where $1=yz+kx$ (y is not x). The new accumulator can be dynamically computed as: $c'=c^y \bmod n$. In some cases, after a deletion of y from X, the new witness can be dynamically computed as $a'=ay$, $d'=d$ and the new accumulator can be dynamically computed as $c'=c^{1/y \bmod \phi(n)} \bmod n$, where $\phi(n)$ is the Euler's totient function.

In some embodiments, further to the description provided above, the accumulator 82 may be modified based on a set non-membership primitive and may be equipped with a mechanism to allow efficient batch updates. The accumulator 82 may also be modified for use of semi-trusted delegate nodes. Additionally, by using zero-knowledge techniques, proof of non-revocation may be made non-transferable so that a verifying entity does not obtain any transferable evidence. Thus, communication requirements and complexity for implementation of the accumulator 82 may be relatively constant.

In some embodiments, batch updates may be provided by applying previous addition algorithms to add several elements $a_i$ in a row, $A=\Pi a_i$, and/or applying previous deletion algorithms to delete several elements $d_i$ in a row, $D=\Pi d_i$. For batch updates, consider the rational number $r=A/D$ and the new accumulator $c'=c$. To reduce the bitlength, replace r by $y=r \bmod \lambda(n)$, and add y to X to update witnesses. $\lambda(n)$ is the least common multiplier of $(p_1-1)^{a_1-1}, \ldots, (p_v-1)^{a_v-1}$, where $p_i$ are the primes of the unique factorization of n. By releasing y instead of r, y becomes coprime with x, therefore one can update a proof of membership of x even though it was deleted, or update a proof of non-membership of x even though it was added. Additionally, by releasing y instead of r, the CA discloses a multiple of $\lambda(n)$, which may be enough information to factor n.

As indicated above, update algorithms are typically run by trusted parties only. Hence, update algorithms are typically concluded to have been run by some trusted delegate of the authority (CA). Some example embodiments may avoid this potential problem by providing a method for use by semi-trusted delegates. Semi-trusted delegates that use the accumulator 82 maliciously may be detected and revoked by the CA.

Accordingly, some example embodiments may provide for a paradigm shift whereby it is assumed that delegate nodes are semi-trusted delegates that may be queried with respect to update proofs. Delegate nodes may keep an updated list of revoked x's. These delegates are semi-trusted in the sense that, although they may cheat by proving non-membership of certificates that belong to the list of revocation, the identity of such cheaters may be determined. Accordingly, in some embodiments, given a distinguished integer h, a witness (or witness value) for x not being in X is a triple (a,b,d) such that $c^a h^b = d^x g \pmod{n}$. The witness value may be provided together with a certificate for the distinguished h. One can easily update a witness when a member is deleted from or added to X. The CA may be configured to pick a random s, compute $h=cg^s \bmod n$ and sign a certificate for distinguishing h. Then, h and s may be sent to the delegate node. The delegate node may use the value s as a trapdoor. In this regard, the delegate node may be enabled to compute proofs and update the current accumulator c with almost no effort, still without being able to factor n.

To compute a witness for x, the delegate node may be configured to first check in its record of revoked certificates X that x is not there (this can be done in time $O(\log|X|)$) and then, since s and x are coprime, the delegate node can compute $bs=kx+1$, $a=-b$, and $d=g^k \bmod n$. In this case, $c^a h^b = c^{-b}(cg^s)^b = g^{bs} = g^{kx+1} = d^x g \pmod n$, so (a,b,d) is a witness for x. This works in time $O((\log n)^3)$. The certificate holder can thereafter update the witness alone. In some cases, the witness leaks the distinguished h that identifies the delegate and the cycle when it was sent. Accordingly, if someone ever finds a witness for a revoked x, the delegate can be traced and revoked. Assuming that this event remains highly unusual, this can by managed by using a regular revocation list or using methods described above.

The semi-trusted delegation described herein may further be combined with zero-knowledge proof mechanisms, as follows. For example, in order for the proof of membership or the proof of non-membership not to provide any transferable evidence to the verifier, a zero-knowledge interactive proof of knowledge for a proof witness may be employed.

As an example, consider a homomorphic function $\phi(\ )$ from G to $Z^*_N$. A prover may pick u (from G) at random, and compute $U=\phi(u)$ to sends the result to a verifier. The verifier may pick e (from $\{1, \ldots, t\}$) at random and send it to the prover. The prover may compute $v=u+ey$ and sends $\phi(v)$ to the verifier. The verifier may check that $\phi(v)=UY^e \bmod N$. All values of x must be prime and larger than t. Thus, there exists $\alpha$ and $\beta$ such that $x\alpha+e\beta=1$. In the membership proof case $(\phi(w)=w^x \bmod n, Y=c, G=Z^*_N)$: $(c^\alpha v^\beta)^x = c \rightarrow \phi(c^\alpha v^\beta)=Y$. In the non-membership proof case $(\phi(a,d)=c^a d^{-x} \bmod n, Y=g, G=Z\times Z^*_N)$: $(c^\alpha)^a(d^{-\alpha}g^{-\beta})^x g \rightarrow \phi(c^\alpha, v^{-\alpha}g^\beta)=Y$.

In an example embodiment, the entry specific Bloom filter 84 may be employed in connection with CRLs in addition to the use of the accumulator 82 or instead of the use of the accumulator 82 to adapt CRL compression to low bitrate channels. However, the use of Bloom filters generally may create significant additional computational overhead since, as indicated above, each un-revocation may require the Bloom filter to compute the entire CRL again, which would require multiple hashes of each entry in the CRL. The recomputation of the CRL is typically due to the fact that a bit that is set in the filter may belong to the hashes of many revoked certificates at the same time as shown in FIG. 3. In such examples, unsetting a given bit (0) because the corresponding certificate was un-revoked may erroneously un-revoke all other certificates having hashes that map to the same bit, thereby severely compromising the mechanism.

Figure 4:
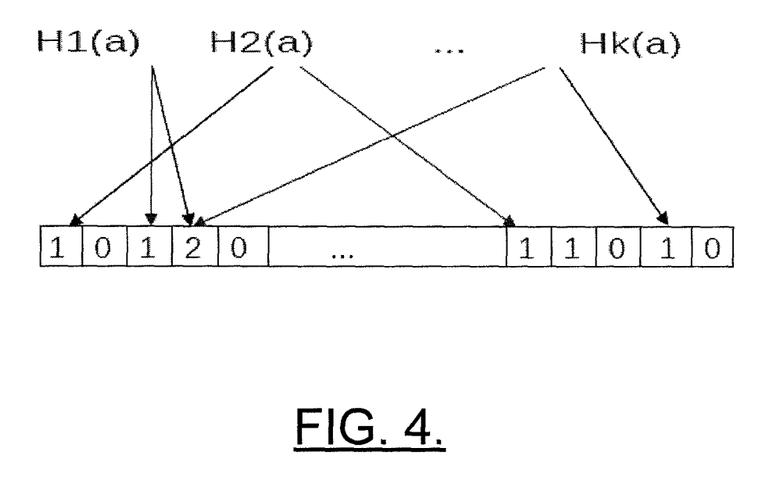
FIG. 4 illustrates a counter Bloom filter according to one example embodiment of the present invention.

Some example embodiments may enable the CA to hash only the entry that is to be un-revoked so that a good compression rate may be provided while avoiding computation of the entire CRL for each un-revocation. To accomplish this, some example embodiments may employ the entry specific Bloom filter 84 may employ a non-binary/counter Bloom filter (CBF) when a certificate is un-revoked (which may happen frequently for users that are revoked for failure to pay fees and the fees come in later on). When building the CRL, the CA may input the certificate identifiers of revoked certificates into the hash functions. The output of the hash functions may point to the bit positions of the Bloom filter to be set (to 1). In an example embodiment, bits are replaced with counters (e.g., in the form of bytes), and whenever a hash points to a given position, the counter is increased by one as shown in FIG. 4.

By adding revoked certificates to the Bloom filter, no difference may be evident between a binary (bit-based) Bloom filter and a non-binary (counter-based) Bloom filter. The difference may become visible when removing certificates from the Bloom filter CRL. In this regard, for removing a certificate from a bit-based Bloom filter CRL (for un-revoking), the CA may need to recompute the whole CRL from scratch as described above. However, by using a counter-based Bloom filter (e.g., the entry specific Bloom filter 84), the CA may only need to hash the identifier of the certificate that is to be un-revoked, and then decrease the corresponding counters by one.

Figure 5:
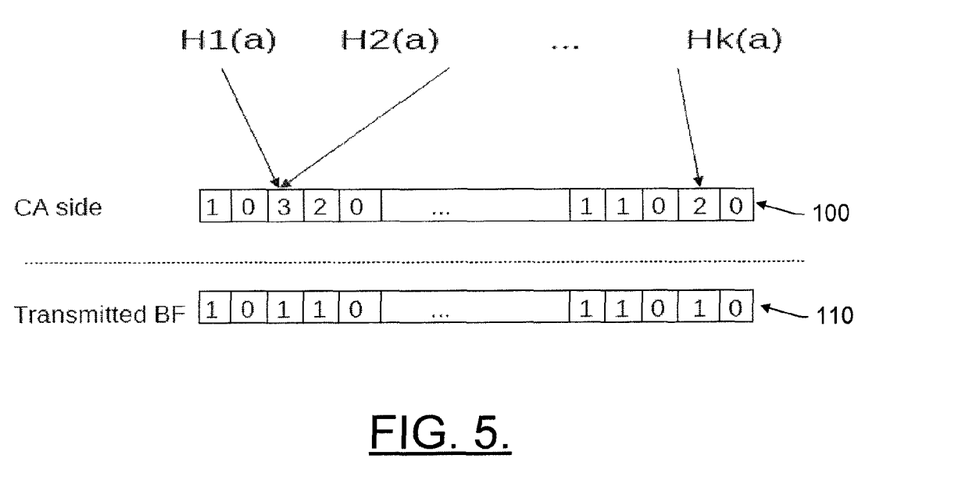
FIG. 5 illustrates an example of a counter Bloom filter generated at a certificate authority and an example of a corresponding binary Bloom filter generated based on the counter Bloom filter and communicated to the according to an example embodiment of the present invention.

Transmission of the counter-based Bloom filter over a communication channel may provide less compression than can be achieved by transmitting the bit-based Bloom filter. For example, the compression rate may be reduced by a factor equal to the counter size in bits. However, the counters themselves are generally of no use to end users, but are just useful for the CA. In fact, to verify whether a certificate belongs to a Bloom filter CRL, the end user device only needs to know if a given position is zero or a value greater than zero. Accordingly, while the CA may maintain the counter-based Bloom filter, the transmitted Bloom filter may convert any value greater than zero to a one value. FIG. 5 illustrates an example of the counter-based Bloom filter maintained at the CA 100 and the transmitted Bloom filter 110 that can be generated by the CA. Accordingly, the CA may be configured to, prior to transmission, convert all values of the counter-based Bloom filter that are greater than zero to one values for transmission of the converted values.

In some cases, provisions may be made to deal with the potential of counter overflow. For example, assume that k hash functions are output to a Bloom filter positions uniformly and randomly, and that each counter at each position is increased by (number of revoked certificates)×k/m times. A ceiling for the number of bits per counter may be ceil(log_2 ((number of revoked certificates)×k/m times). Accordingly, the bit-size for each counter may be preset based on the ceiling, and may be dynamically adapted (e.g., upon each overflow of the counter) by adding a "counter bit-length" field at the beginning of the filter.

Figure 6:
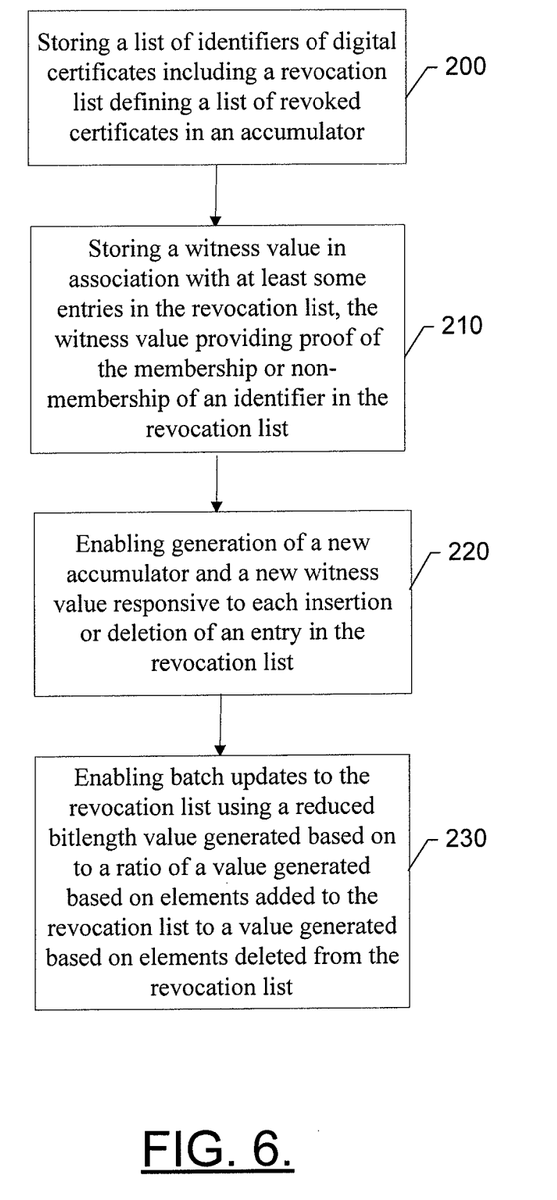
FIG. 6 is a flowchart according to an example method for providing efficient management of certificate revocation according to an example embodiment of the present invention.
Figure 7:
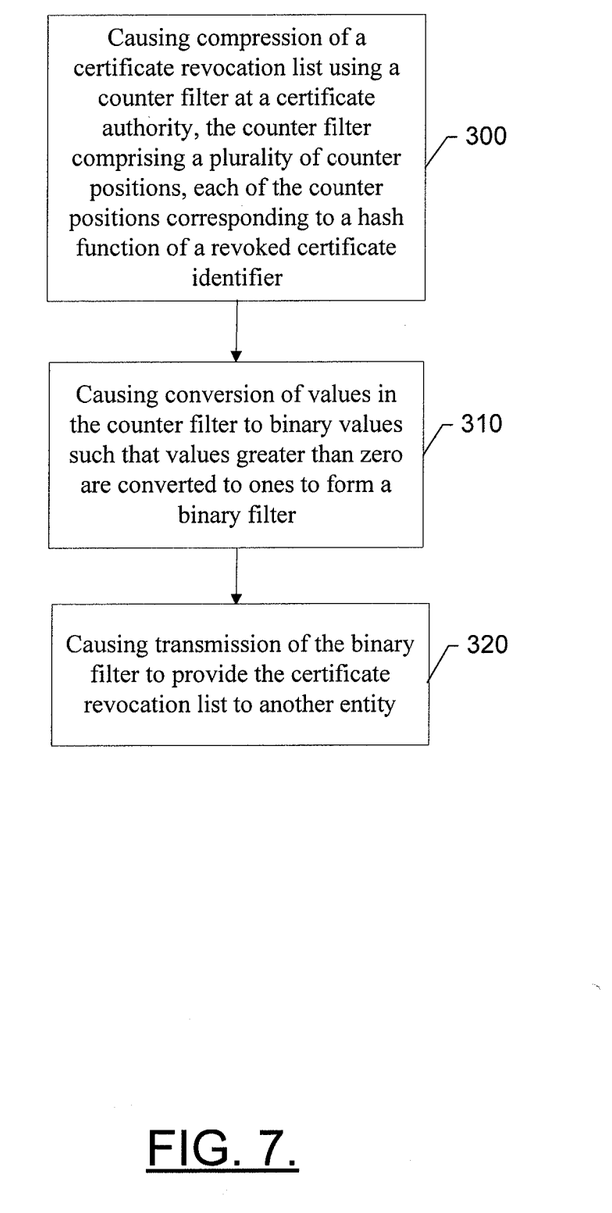
FIG. 7 is a flowchart according to another example method for providing efficient management of certificate revocation according to an example embodiment of the present invention.

FIGS. 6 and 7 illustrate flowcharts of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture which implements the functions specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 6, may comprise storing a list of identifiers of digital certificates including a revocation list defining a list of revoked certificates in an accumulator at operation 200 and storing a witness value in association with at least some entries in the revocation list in which the witness value provides proof of the membership or non-membership of an identifier in the revocation list at operation 210. The method may further comprise enabling generation of a new accumulator and a new witness value responsive to each insertion or deletion of an entry in the revocation list at operation 220, and enabling batch updates to the revocation list using a reduced bitlength value generated based on to a ratio of a value generated based on elements added to the revocation list to a value generated based on elements deleted from the revocation list at operation 230.

In some embodiments, certain ones of the operations above may be modified or further amplified as described below. Moreover, in some embodiments additional optional operations may also be comprised. It should be appreciated that each of the modifications, optional additions or amplifications below may be comprised with the operations above either alone or in combination with any others among the features described herein. In some embodiments, enabling batch updates comprises using the reduced bitlength value r replaced by $y=r \mod \lambda(n)$, where $r=A/D$ and where $a_i$ defines elements to be added in a row, $A=\Pi a_i$, and $d_i$ defines elements to be deleted in a row, $D=\Pi d_i$, to add y as an entry to a set X to update witness values. $\lambda(n)$ is the least common multiplier of $(p_1-1)^{a_1-1}, \ldots, (p_v-1)^{a_v-1}$, where $p_i$ are the primes of the unique factorization of n. In an example embodiment, storing the list, storing the witness value, enabling generation of the new accumulator and the new witness value, and enabling batch updates is performed at a certificate authority or at a semi-trusted delegate. In some embodiments, the certificate authority may be enabled to monitor activity of the semi-trusted delegate with respect to at least generation of the new witness value and revoke the semi-trusted delegate based on irregularities associated with generation of the new witness value. In some cases, the semi-trusted delegate may be enabled to generate witness values to provide proof of membership or non-membership using a zero-knowledge proof mechanism.

In an example embodiment, an apparatus for performing the method of FIG. 6 above may comprise a processor (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the CA or revocation list manager 80. Additionally or alternatively, at least by virtue of the fact that the processor 70 may be configured to control or even be embodied as the revocation list manager 80, the processor 70 and/or a device or circuitry for executing instructions or executing an algorithm for processing information as described above may also form example means for performing operations 200-230.

In some cases, the operations (200-230) described above, along with any of the modifications may be implemented in a method that involves facilitating access to at least one interface to allow access to at least one service via at least one network. In such cases, the at least one service may be said to perform at least operations 200 to 230.

In another embodiment, a method for performing efficient management of certificate revocation, as shown in FIG. 7, may comprise causing compression of a certificate revocation list using a counter filter at a certificate authority at operation 300. The counter filter may comprise a plurality of counter positions and each of the counter positions may correspond to a hash function of a revoked certificate identifier. The method may further comprise causing conversion of values in the counter filter to binary values such that values greater than zero are converted to ones to form a binary filter at operation 310, and causing transmission of the binary filter to provide the certificate revocation list to another entity at operation 320.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, the counter filter may be a counter Bloom filter and the binary filter may be a binary Bloom filter. In some embodiments, causing compression may comprise using the counter Bloom filter for compression in which the counter positions are incremented by one for a corresponding hash of each certificate added to the certificate revocation list and decremented by one for the corresponding hash of each certificate deleted from the certificate revocation list.

In an example embodiment, an apparatus for performing the method of FIG. 7 above may comprise a processor (e.g., the processor 70) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the CA or revocation list manager 80. Additionally or alternatively, at least by virtue of the fact that the processor 70 may be configured to control or even be embodied as the revocation list manager 80, the processor 70 and/or a device or circuitry for executing instructions or executing an algorithm for processing information as described above may also form example means for performing operations 300-320.

In some cases, the operations (300-320) described above, along with any of the modifications may be implemented in a method that involves facilitating access to at least one interface to allow access to at least one service via at least one network. In such cases, the at least one service may be said to perform at least operations 300 to 320.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   storing a list of identifiers of digital certificates including a revocation list defining a list of revoked certificates in an accumulator;
   storing a witness value in association with at least some entries in the revocation list, the witness value providing proof of the membership or non-membership of an identifier in the revocation list;
   enabling generation of a new accumulator and a new witness value responsive to each insertion or deletion of an entry in the revocation list; and
   enabling batch updates to the revocation list using a reduced bitlength value generated based on to a ratio of a first value generated based on elements added to the revocation list to a second value generated based on elements deleted from the revocation list.

2. The method of claim 1, wherein enabling batch updates comprises using the reduced bitlength value r replaced by y=r mod λ(n), where r=A/D and where $a_i$ defines elements to be added in a row, A=$\Pi a_i$, and $d_i$ defines elements to be deleted in a row, D=$\Pi d_i$, to add y as an entry to a set X to update witness values and λ(n) is the least common multiplier of $(p_1-1)^{a-1}{}_1, \ldots, (p_v-1)^{a-1}{}_v$, where $p_i$ are primes of a unique factorization of n.

3. The method of claim 1, wherein storing the list, storing the witness value, enabling generation of the new accumulator and the new witness value, and enabling batch updates is performed at a certificate authority.

4. The method of claim 3, wherein storing the list, storing the witness value, enabling generation of the new accumulator and the new witness value, and enabling batch updates is enabled to be performed at a semi-trusted delegate.

5. The method of claim 4, wherein the certificate authority is enabled to monitor activity of the semi-trusted delegate with respect to at least generation of the new witness value and revoke the semi-trusted delegate based on irregularities associated with generation of the new witness value.

6. The method of claim 4, wherein the semi-trusted delegate is enabled to generate witness values to provide proof of membership or non-membership using a zero-knowledge proof mechanism.

7. An apparatus comprising at least one processor and at least one memory including computer program code, the at least one memory and the computer program code configured to, with the at least one processor, cause the apparatus at least to:
   store a list of identifiers of digital certificates including a revocation list defining a list of revoked certificates in an accumulator;

store a witness value in association with at least some entries in the revocation list, the witness value providing proof of the membership or non-membership of an identifier in the revocation list;

enable generation of a new accumulator and a new witness value responsive to each insertion or deletion of an entry in the revocation list; and enable batch updates to the revocation list using a reduced bitlength value generated based on to a ratio of a first value generated based on elements added to the revocation list to a second value generated based on elements deleted from the revocation list.

8. The apparatus of claim 7, wherein the at least one memory and computer program code are configured to, with the at least one processor, cause the apparatus to enable batch updates by using the reduced bitlength value r replaced by $y=r \mod \lambda(n)$, where $r=A/D$ and where $a_i$ defines elements to be added in a row, $A=\Pi a_i$, and $d_i$ defines elements to be deleted in a row, $D=\Pi d_i$ to add y as an entry to a set X to update witness values and $\lambda(n)$ is the least common multiplier of $(p_1-1)^{a-1}{}_1, \ldots, (p_v-1)^{a-1}{}_v$, where $p_i$ are the primes of the unique factorization of n.

9. The apparatus of claim 7, wherein the apparatus is embodied at a certificate authority.

10. The apparatus of claim 9, wherein the at least one memory and computer program code are configured to, with the at least one processor, cause the apparatus to store the list, store the witness value, enable generation of the new accumulator and the new witness value, and enable batch updates at a semi-trusted delegate.

11. The apparatus of claim 10, wherein the certificate authority is enabled to monitor activity of the semi-trusted delegate with respect to at least generation of the new witness value and revoke the semi-trusted delegate based on irregularities associated with generation of the new witness value.

12. The apparatus of claim 10, wherein the semi-trusted delegate is enabled to generate witness values to provide proof of membership or non-membership using a zero-knowledge proof mechanism.

* * * * *